Patented Mar. 29, 1949

2,465,586

UNITED STATES PATENT OFFICE 2,465,586

PROCESS FOR PRODUCING ALDEHYDES AND DERIVATIVES THEREOF

Bela Gaspar, Hollywood, Calif., assignor to Chromogen, Incorporated, a corporation of Nevada No Drawing. Application November 1, 1943, Serial No. 508,637. In Great Britain February 4, 1939

6 Claims. (Cl. 260—601)

This application is a continuation-in-part of my application S. N. 316,227, filed January 29, 1940, now abandoned, and relates to processes for manufacturing organic compounds, more particularly stable derivatives of unstable dialdehydes, which derivatives may be readily converted to or used in lieu of the free dialdehydes.

It is known for example that malondialdehyde is not very stable (cf. Chemical Abstracts, vol. 36, 1942, 5139, line 27 from the bottom) therefore, it is preferable to use it for reactions in the form of its stable tautomeric derivatives such as acetals (b. beta-ethoxyacroleinacetal) or its sodium salt (sodium beta-hydroxy-acrolein), or its dianilide salt (e. g. beta-anilino acrolein anil hydrochloride (propendianilide hydrochloride) or perchlorate. Its higher homologue, the glutacondialdehyde is likewise unstable (cf. Berichte 59 (1926), page 1170). My improved method permits making the stable tautomeric derivatives such as their acetals or dianilides. These tautomeric stable derivatives of malondialdehyde, its substitution products and higher homologues and derivatives, behave in most reactions as free dialdehydes. In the following specification and actual procedures of preparation refer to the tautomeric stable compounds of malondialdehyde, its substitution products and higher homologues and derivatives, and it is obvious that from the stable tautomeric compounds the free unstable aldehyde can be liberated by methods well known in the art. However, for most purposes such a liberation of the free aldehydes is unnecessary as their stable compounds take part in many condensations exchanging the dialdehyde residue:

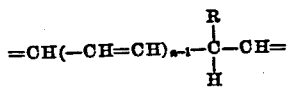

or

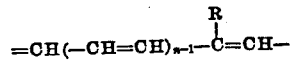

Generically, the invention may be stated to comprise a process for the preparation of compounds of the general formula:

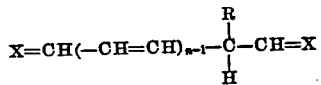

in which (a) the hydrogen atoms of the polymethine chain may be substituted; (b) X is a double bound oxygen atom, a double bound arylimino group or two single —O-alkyl groups; (c) R is a hydrogen atom or an alkyl or aryl group and (d) n is equal to a positive integer, or of compounds of the tautomeric formula:

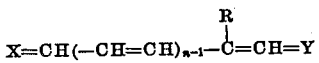

in which Y is an O-Me group (Me being an alkali metal), an O-alkyl group, an arylamino group or —OH.

These two tautomeric formulae may be comprehended by the following formula:

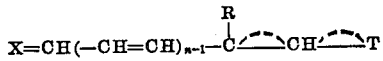

wherein one of the symbols ⌒ stands for a single valency and the other symbol ⌒ stands for two valencies, and wherein T single bound to the neighbouring carbon atom stands for Y (as defined above) and wherein T double bound to the neighbouring carbon atom stands simultaneously for X (as defined above) and for a hydrogen atom linked to the following carbon atom of the chain of carbon atoms, according to the invention. Compounds of these formula are obtained by condensing a compound of the general formula:

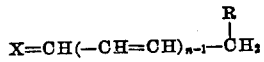

wherein X is a double bound oxygen atom, a double bound arylimino group or two single O-alkyl groups, with a formyl compound of the general formula

wherein Z is a double bound oxygen atom, a double bound arylimino group or two single bound O-alkyl groups and wherein Y is an O-Me group, an O-alkyl group, an arylamino group or —OH, and replacing, if required, the groups X and Y in the condensation product thus obtained by treatment, for example, with hydrochloric acid, aniline hydrochloride, dialkyl sulphate, alkyl halide or diazomethane.

The hitherto known preparation of malondialdehyde in the form of its stable derivatives is difficult. It requires bromination of acrolein which is a strongly irritating substance. This forms dibromoacrolein, which, in turn, is converted into monobromoacrolein acetal which is converted with sodium ethoxide into beta-ethoxy acrolein acetal. This latter compound is used for preparation of its anilide or for the preparation of its sodium salt: Sodium beta-hydroxyacrolein. There are no simple and reliable methods known for the preparation of the alpha-substituted compounds and I have found that the preparation of the malondialdehyde in the form of its stable derivatives, its substitution products and its higher homologues can be performed in a simple way by condensing formic acid, its salts or derivatives (esters, anilides) with an aldehyde. In many cases, the yield is not very high but in view of the possibility of starting with inexpensive materials, and in view of the simplicity of the reactions involved the method is very valuable. Furthermore, many of the substitution products can be synthesized for the first time by my method.

For the detection of the dialdehydes and their homologues and substitution products a very sensitive and specific color reaction can be used, that is, the formation of di- and tri-carbocyanine dyes, e. g. with 2-methylbenzothiazole ethyl toluenesulfonate in pyridine, sometimes under addition of triethylamine, whereby beautiful blue-green dyes are formed which give sharp absorption spectra with an absorption maximum around 650 m$\mu$ for the dicarbocyanines and at 765 m$\mu$ for the tricarbocyanine dyes (cf. Journal of the Chemical Society, London 1936, page 191).

In carrying out the new process, acetaldehyde, its derivatives, e. g. diacetals, or its homologues, in particular those having a double bond neighbouring the end methyl group, may be condensed with formyl compounds, in particular alkylformates, in the presence of condensing agents, such as alkali-metals, e. g. metallic sodium, alkali alcoholates or acetic anhydride; and preferably with the addition of diluents, such as ether or benzol. The free dialdehyde may be obtained by heating in diluted acids the sodium oxymethylene-aldehyde-diacetals formed in the process of condensation. These oxymethylene compounds may also be converted in the well-known manner into derivatives of the dialdehyde, e. g. its dianilide.

Example 1.—65 ccs. of ethyl ether are poured on to .1 mol metallic sodium. To this is slowly added a mixture of .1 mol acetaldehyde-diacetal and .1 mol ethyl-formate, the whole being shaken in the process. The whole is then allowed to stand for three weeks, during which time the mixture turns into a white crystalline mass which is filtered out, then washed with ether and finally dried on clay dishes on a desiccator. When warmed in diluted hydrochloric acid, the beta-sodium-oxyacrolein-acetal thus obtained yields a solution of malon-dialdehyde that is not stable in itself.

In order to obtain the dianilide, .1 mol of the beta-sodium-oxyacrolein-acetal is dissolved in 100 ccs. of water, a solution of .2 mol anilin-hydrochloride in 100 ccs. of water is allowed to drop into it, and then 30 ccs. of 2n hydrochloric acid is added to the whole in order to keep the aniline in solution. After standing alone, the light brown fluid, from which a yellow precipitate begins to separate out, turns colorless after the complete deposit of the brownish-yellow crystals. The crystals are filtered off and washed with water. By recrystallizing from aqueous alcohol, orange-yellow needles of anilidoacrolein-anilhydrochloride (melting point 210° C.) are obtained.

Example 2.—In the same manner as in Example 1, phenyl-malondialdehyde-dianilide (melting point 130° C.) may be prepared, employing phenyl-acetaldehyde-dimethylacetal instead of acetaldehyde-diacetal.

Example 3.—70 ccs. of dry ether are poured on to .1 mol sodium ethylate and a mixture of .1 mol acetal and .1 mol ethyl formate is slowly added. After standing for 24 hours, the beta-sodium oxyacroleine acetal is filtered off and washed with ether.

Example 4.—.1 mol acetal, .1 mol ethylorthoformate (tri-ethoxymethane) and 20 grms. of acetic anhydride are heated on an oil bath under a reflux condenser for 4 hours at 125° C. The volatile substances are then distilled off until the temperature reaches 170° C. and the residue is ethoxyacroleine acetal.

Example 5.—.1 mol crotonic aldehyde, .1 mol ethylorthoformate (tri-ethoxymethane) and 20 grms. acetic anhydride are heated under a reflux condenser on an oil bath for 7 hours at 125° C. The volatile substances are then distilled off until the temperature reaches 180° C. The residue is ($\epsilon$)-ethoxypentadienal diethylacetal of the formula:

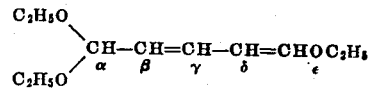

which may be easily converted into glutacone dialdehyde dianilide by treatment with a solution of aniline in diluted hydrochloric acid.

Example 6.—.1 mol diphenyl formamidine and .1 mol phenyl acetaldehyde dimethylacetal are heated on an oil bath for 10 hours at 140° C. The compound formed, which is believed to be beta-anilido-$\alpha$-phenylacroleine acetal of the formula:

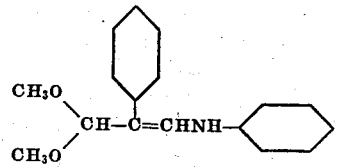

is recrystallized from ethyl alcohol and forms yellow laminae having a melting point of 135° C.

Example 7.—A mixture of 24 ccs. methylformate (0.4 mol) and 8.9 ccs. n-butyraldehyde (0.1 mol) is cooled to 3° C. in an ice-salt mixture, thereafter 6 grams of 95% dry sodium methylate are added in small portions while shaking during a period of fifteen to twenty minutes. The mixture is then kept in the ice-salt bath, closed to the atmosphere under a soda lime tube for a further four hours and thereafter it is kept in the ice box for three days. The methylformate is distilled off and a mixture of 18 ccs. aniline and 18 ccs. acetic acid in 35 ccs. of water is added. After mixing a thick viscous oily layer is formed which is poured into 75 ccs. of 30% methylalcohol, 10 grams sodium perchlorate is then added in aqueous solution. A pale yellow precipitate forms which is filtered. The oily precipitate and the solid are retained on the filter and are again dissolved in 35 ccs. methylalcohol and chilled in ice. Yellow crystals of alpha-ethyl-propene dianilide perchlorate (alpha-ethyl malondialdehyde dianilide perchlorate) form. After recrystallization the melting point is 224° C. under decomposition. This compound gives in pyridine and triethylamine with 2 methylbenzothiazole ethyltoluenesulphonate a dicarbocyanine dye:

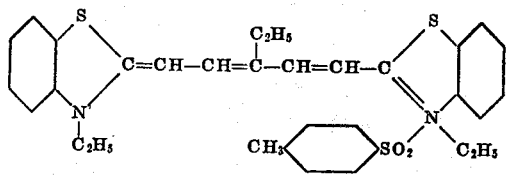

the absorption maximum of which in methylalcohol solution is about 650 m$\mu$.

*Example 8.*—A mixture of 12 grams propionaldehyde and 20 grams formic acid is dropped at a slow rate into a heated flask so that it vaporizes immediately and the vapors are carried by a slow stream of nitrogen into a hard glass tube containing 10% thorium oxide on pumice which is heated to 430° C. The rate of the drops is regulated in such a way that it takes 165 minutes to use the above mentioned quantity. The vapors are collected in a flask which is cooled with ice. The condensate is poured into water and an aqueous solution of aniline hydrochloride is added and some sodium acetate. The solution is diluted and turns yellow. Finally a concentrated solution of sodium perchlorate is added. Alpha methyl malondialdehyde dianilide perchlorate (alpha methyl propendianilide perchlorate) is precipitated. It can be recrystallized from methyl alcohol. It has an unsharp melting point at 210-220° C. under decomposition.

In the above examples, the propionealdehyde can be substituted with acetaldehyde, acetal, paraldehyde, butyraldehyde or any higher homologue aldehyde which has a replaceable hydrogen in the alpha position.

*Example 9.*—The same compound can be obtained by refluxing 0.1 mol butyraldehyde with 0.2 mol formic acid in 1 mol acetic anhydride for six hours and distilling away in vacuum the excess of formic and acetic acid and the anhydride. The residue is treated with aniline and acetic acid and finally with sodium perchlorate, as in the previous example, and the alpha ethylpropene dianilide is precipitated and recrystallized from methyl alcohol.

Instead of a mixture of formic acid and acetic anhydride, sodium formate and acetic anhydride or acetylformate (Béhal, Compt. Rendue, volume 128, page 1460 (1899)), can be used.

Although I have herein disclosed specific embodiments of my invention, I do not intend to limit myself solely thereto, for many modifications and variations fall within the spirit and scope of the appended claims.

What is claimed is:

1. The process of producing a compound which comprises reacting under substantial dehydrating conditions a compound corresponding to the general formula

wherein X represents a member of the group consisting of double bound oxygen and two single bound O-alkyl groups, wherein *n* represents a positive integer, wherein R represents a member of the group consisting of hydrogen, alkyl and aryl, with a compound selected from the group consisting of formic acid, alkyl formate, alkyl ortho formate and alkali metal formate thus producing a compound corresponding to the general formula

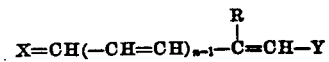

wherein Y is a member of the group consisting of O-alkyl, O-alkali metal and OH.

2. The process of producing a compound which comprises reacting under dehydrating conditions a compound corresponding to the general formula

wherein X represents a member of the group consisting of double bound oxygen and two single bound O-alkyl groups, wherein *n* represents a positive integer, wherein R represents a member of the group consisting of hydrogen, alkyl and aryl, with a compound selected from the group consisting of formic acid, alkyl formate, alkyl ortho formate and alkali metal formate in the presence of a condensing agent thus producing a compound corresponding to the general formula

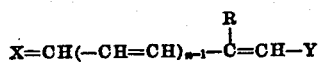

wherein Y is a member of the group consisting of O-alkyl, O-alkali metal and OH.

3. The process of producing a compound which comprises reacting under dehydrating conditions a compound corresponding to the general formula

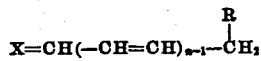

wherein X represents a member of the group consisting of double bound oxygen and two single bound O-alkyl groups, wherein *n* represents a positive integer, wherein R represents a member of the group consisting of hydrogen, alkyl and aryl, with a compound selected from the group consisting of formic acid, alkyl formate, alkyl ortho formate and alkali metal formate in the presence of a condensing agent and a diluent thus producing a compound corresponding to the general formula

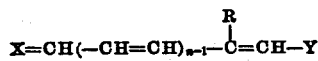

wherein Y is a member of the group consisting of O-alkyl, O-alkali metal and OH.

4. The process of producing a compound which comprises the steps of reacting under dehydrating conditions a compound corresponding to the general formula

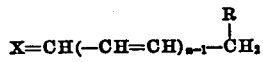

wherein X represents a member of the group consisting of double bound oxygen and two single bound O-alkyl groups, wherein *n* represents a positive integer, wherein R represents a member of the group consisting of hydrogen, alkyl and aryl, with a compound selected from the group consisting of formic acid, alkyl formate, alkyl ortho formate and alkali metal formate thus producing a compound corresponding to the general formula

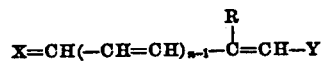

wherein Y is a member of the group consisting of O-alkyl, O-alkali metal and OH and the step of treating the condensation product with a hydrolizing agent.

5. The process of producing a compound which comprises reacting under dehydrating conditions a compound corresponding to the general formula

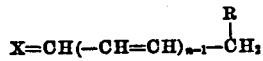

wherein X represents a member of the group consisting of double bound oxygen and two single bound O-alkyl groups, wherein *n* represents a positive integer, wherein R represents a member of the group consisting of hydrogen, alkyl and aryl, with an alkyl formate and a condensing agent selected from the group consisting of alkali metals and alkali alcoholates thus producing a compound corresponding to the general formula

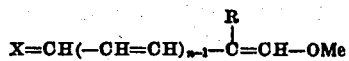

wherein Me stands for alkali metal.

6. The process of producing a compound which comprises reacting under substantial dehydrating conditions a compound corresponding to the general formula

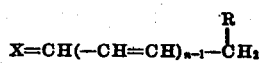

wherein X represents a member of the group consisting of double bound oxygen and two single bound O-alkyl groups, wherein $n$ represents a positive integer, wherein R represents a member of the group consisting of hydrogen, alkyl and aryl, with tri-ethoxy methane thus producing a compound corresponding to the general formula

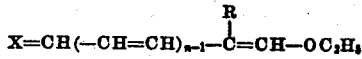

BELA GASPAR.

REFERENCES CITED

The following references are of record in the file of this patent:

UNITED STATES PATENTS

| Number | Name | Date |
| --- | --- | --- |
| 1,994,732 | Sebrell | Mar. 19, 1935 |
| 2,028,141 | Achermann | Jan. 21, 1936 |
| 2,036,304 | Seymour | Apr. 7, 1936 |
| 2,152,371 | Wyler | Mar. 28, 1939 |
| 2,269,234 | Spraque | Jan. 6, 1942 |

FOREIGN PATENTS

| Number | Country | Date |
| --- | --- | --- |
| 553,177 | Germany | June 22, 1932 |

OTHER REFERENCES

"Monat. of Chem.," Plattenstomer, vol. 22, pages 18 and 19. (Library of Congress.)